United States Patent
Marupaduga

(10) Patent No.: US 11,350,313 B1
(45) Date of Patent: May 31, 2022

(54) DYNAMIC CONTROL OF UPLINK COMMUNICATION FROM A DUAL-CONNECTED DEVICE, BASED ON ANTENNA PATTERN EFFICIENCY PER CONNECTION

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/948,109

(22) Filed: Sep. 3, 2020

(51) Int. Cl.
*H04W 28/08* (2009.01)
*H04W 92/10* (2009.01)

(52) U.S. Cl.
CPC ... *H04W 28/0958* (2020.05); *H04W 28/0808* (2020.05); *H04W 28/0858* (2020.05); *H04W 92/10* (2013.01)

(58) Field of Classification Search
CPC ... H04L 5/0032; H04L 5/0035; H04L 5/0091; H04L 5/0092; H04L 47/10; H04L 47/125; H04L 47/14; H04W 28/02; H04W 28/0205; H04W 28/0236; H04W 28/0247; H04W 28/08; H04W 40/06; H04W 47/10; H04W 47/125; H04W 74/02; H04W 72/04; H04W 72/0426; H04W 72/048; H04W 88/10; H04W 92/20
See application file for complete search history.

(56) References Cited

U.S. PATENT DOCUMENTS

| | | | |
|---|---|---|---|
| 6,262,980 B1 * | 7/2001 | Leung | H04L 41/0896 370/336 |
| 8,185,060 B2 | 5/2012 | Agashe et al. | |
| 8,285,321 B2 | 10/2012 | Ji et al. | |
| 9,392,515 B2 | 7/2016 | Wang et al. | |
| 9,699,800 B2 | 7/2017 | Himayat et al. | |
| 10,104,584 B2 | 10/2018 | Cai | |
| 10,141,983 B2 | 11/2018 | Kim et al. | |

(Continued)

OTHER PUBLICATIONS

Tariq Mumtaz, et al., "Dual Connectivity-Based Mobility Management and Data Split Mechanism in 4G/5G Cellular Networks," IEEE Access, vol. 8, May 20, 2020.

*Primary Examiner* — Kan Yuen

(57) ABSTRACT

A method and system for controlling uplink communication from a user equipment device (UE) that has at least two co-existing air-interface connections including a first air-interface connection with a first access node and a second air-interface connection with a second access node. An example method includes comparing a level of antenna pattern efficiency associated with the first air-interface connection with a level of antenna pattern efficiency associated with the second air-interface connection and, based at least on the comparing, configuring an uplink split ratio defining a distribution of uplink user-plane data flow of the UE between at least the first air-interface connection and the second air-interface connection. In an example implementation, this could involve configuring one of the air-interface connections as a primary uplink path to which the UE restricts its uplink communication unless and until a trigger occurs for transitioning the UE to operate in an split-uplink mode.

18 Claims, 5 Drawing Sheets

(56) References Cited

U.S. PATENT DOCUMENTS

| | | |
|---|---|---|
| 10,237,735 B2 | 3/2019 | Kim et al. |
| 10,292,140 B2 | 5/2019 | Nam et al. |
| 10,314,055 B1 | 6/2019 | Marupaduga et al. |
| 2008/0198808 A1* | 8/2008 | Hwang ................. H04W 36/06 370/331 |
| 2015/0085800 A1* | 3/2015 | Sivanesan ............. H04L 1/1887 370/329 |
| 2016/0234714 A1 | 8/2016 | Basu Mallick et al. |
| 2017/0079015 A1* | 3/2017 | Takahashi ......... H04W 28/0236 |
| 2019/0098606 A1 | 3/2019 | Sharma et al. |
| 2020/0029258 A1* | 1/2020 | Jacobson .............. H04W 48/16 |

\* cited by examiner

DYNAMIC CONTROL OF UPLINK COMMUNICATION FROM A DUAL-CONNECTED DEVICE, BASED ON ANTENNA PATTERN EFFICIENCY PER CONNECTION

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth and a center frequency and thus extending from a low-end frequency to a high-end frequency.

Further each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

On the downlink and uplink, the air interface provided by an access node on a given carrier could be configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random access signaling from UEs to the access node, and other resource elements could be reserved to carry other control signaling such as PRB-scheduling requests, acknowledgement messaging, and channel-quality reports from UEs to the access node.

To facilitate providing this coverage and service, each access node could be configured with one or more antennas, power amplifiers and associated circuitry, cooperatively enabling the access node to transmit and receive electromagnetic signals in a region defined by an antenna pattern.

The antenna pattern of an access node could define a coverage footprint in which the access node can engage in downlink transmission to UEs and receive uplink transmission from UEs. Such an antenna pattern could have a main lobe and could be characterized by an azimuth angle, an elevation angle, a beamwidth, and a radius. In polar coordinates, the azimuth angle could define a direction of radiation of the main lobe within a horizontal plane, as an angle of rotation around a vertical axis (in relation to North (zero degrees) for instance), the elevation angle could define a direction of radiation of the main lobe within a vertical plane, as an angle of rotation around a horizontal axis (in relation to the horizon for instance), and the beamwidth could define an angular width of the main lobe within the horizontal plane, typically measured between half-power (−3 dB) points of the main lobe for instance. Further, the radius of the antenna pattern could define the effective distance of radiation from the access node as measured at a ground plane for instance, among other possibilities.

OVERVIEW

When a UE enters into coverage of an example network, the UE could detect threshold strong coverage of an access node on a particular carrier (e.g., a threshold strong reference signal broadcast by the access node on the carrier) and could then engage in random-access and connection signaling, such as Radio Resource Control (RRC) signaling, to establish an air-interface connection (e.g., RRC connection) through which the access node will then serve the UE on that carrier.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including (i) an access-bearer portion that extends between the access node and a core-network gateway system that provides connectivity with a transport network and (i) a data-radio-bearer portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) scheduling directive that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI scheduling directive that designates those upcoming PRBs. And the UE could then accordingly transmit the transport block to the access node in the designated PRBs.

For each such scheduled downlink or uplink communication on PRBs between an access node and a UE, the access node and UE could use a modulation and coding scheme (MCS) that the access node selects based on the UE's wireless channel quality and the access node specifies in its scheduling directive to the UE.

In a representative implementation, the MCS could define a coding rate based on the extent of error-correction coding data or the like that would be transmitted together with the user-plane data being communicated, and a modulation scheme that establishes how many bits of data could be carried by each resource element. When channel quality is better, the access node may direct use of a higher-order MCS that has a higher coding rate (e.g., with more error-correction coding) and/or hat supports more bits per resource element, and when channel quality is worse, the access node may direct use of a lower-order MCS that may have a lower coding rate and/or supports fewer bits per resource element.

Examples of modulation schemes include, without limitation, quadrature phase-shift keying (QPSK), in which each resource element represents 2 bits of data, 8 phase-shift keying (8PSK), in which each resource element represents 3 bits of data, 16 quadrature amplitude modulation (16QAM), in which each resource element represents 4 bits of data, 32QAM, in which each resource element represents 5 bits of data, 64QAM, in which each resource element represents 6 bits of data, and 256QAM, in which each resource element represents 8 bits of data.

The access node could determine the MCS to be used use in a given instance primarily based on wireless channel quality reported by the UE. For example, as the access node serves the UE, the UE could transmit channel quality reports to the access node periodically and/or as part of the UE's scheduling requests or other communications to the access node, with each report including a channel-quality indicator (CQI) value representing the UE's determined channel quality and perhaps one or more other channel metrics such as downlink reference signal receive power (RSRP), signal-to-interference-plus-noise ratio (SINR), or the like. When the access node schedules communications to or from the UE, the access node could then map the UE's latest reported CQI value to a corresponding MCS value using a standard CQI-MCS mapping table, and the access node could direct use of that MCS in the scheduling directive that the access node sends to the UE. Communication could thus occur using that directed MCS.

Further, for uplink communication from a UE, the access node could additionally base its selection of MCS on a consideration of the UE's power headroom, namely, the extent to which the UE is able to transmit at a power level that is high enough to provide the access node with sufficient uplink SINR.

In practice, as the access node serves the UE, the access node could regularly estimate SINR of transmissions that the access node receives from the UE and could compare the SINR with an SINR set point (e.g., dynamically established based on observed error rate) and accordingly direct the UE to either increment or decrement the UE's transmit power. And on an ongoing basis, the UE could compute its power headroom as the difference between a configured maximum transmit power level (e.g., maximum average transmit power) of the UE and the power level at which the UE should be transmitting based on the power-control commands from the access node.

Each time the UE sends a scheduling request to the access node, the UE could include in the scheduling request a power-headroom report (PHR) indicating the UE's current power headroom. (Such a report may effectively indicate the UE's power headroom by providing a value that maps to, equals, or otherwise represents the UE's power headroom.) And the access node could then use that reported power headroom as a basis to set or adjust the MCS that the access node will direct the UE to use for uplink transmission. If the power headroom is negative, for instance, the access node might artificially reduce the MCS-order from the MCS that corresponds with the UE's reported CQI.

When the industry advances from one generation of wireless technology to the next, or in other scenarios, networks and UEs may also support dual-connectivity service, where a UE is served on co-existing connections, perhaps according to multiple different RATs.

For instance, a first access node could be configured to provide service according to a first RAT and a second access node could be configured to provide service according to a second RAT, and a UE positioned concurrently within coverage of both the first and second access nodes could have a first radio configured to engage in service according to the first RAT and a second radio configured to engage in service according to the second RAT. With this arrangement, the UE may be able to establish a first air-interface connection with the first access node according to the first RAT and a second air-interface connection with the second access node according to the second RAT, and the access nodes may then concurrently serve the UE over those connections according to their respective RATs.

Such dual connectivity (or "non-standalone" connectivity) could help facilitate increased peak data-rate of communications, by multiplexing the UE's communications across the multiple air-interface connections. Further or alternatively, dual connectivity may provide other benefits compared with serving a UE on a single connection (as "standalone" connectivity).

In a representative dual-connectivity implementation, one of the access nodes could operate as a master node (MN), responsible for coordinating setup, management, and teardown of dual-connectivity service for the UE and functioning as an anchor point for RRC signaling and core-network control signaling related to the dual-connected UE. And each of one or more other access nodes could operate as a secondary node (SN) mainly to provide additional connectivity and increased aggregate bandwidth for the UE.

In such an implementation, the UE might initially establish a first air-interface connection between the UE and the MN in the manner noted above for instance. And upon determining that the UE supports dual-connectivity service, the MN might then coordinate setup of dual connectivity for the UE.

Coordinating setup of dual connectivity for the UE could involve engaging in signaling to coordinate setup of a second air-interface connection between the UE and the SN. For instance, the MN could engage in signaling with the SN to arrange for setup of the second connection, and the MN could engage in signaling with the UE to cause the UE to access the SN and complete setup of the second connection.

In addition, coordinating setup of dual connectivity for the UE could also involve engaging in signaling, for each of one or more bearers established for the UE, to split the bearer so that the MN and SN can then each serve a portion of the UE's data communications. For instance, the MN could engage in signaling to establish a bearer split at the core-network gateway system, with one access-bearer leg extending between the gateway system and the MN and another access-bearer leg extending between the gateway system and the SN. Alternatively, the MN could engaging signaling to establish a bearer split at the MN, with the UE's access bearer remaining anchored at the MN and a branch of the access bearer extending between the MN and the SN. And still alternatively, the MN could engage in signaling to establish a bearer split at the SN, with the UE's access bearer being transferred to and anchored at the SN and a branch of the access bearer extending between the SN and the MN.

With dual-connectivity so configured by way of example, the MN and SN could then serve the UE with packet-data communications over their respective connections with the UE, with each access node coordinating air-interface communication in the manner described above for instance.

In an example implementation, the UE's downlink user-plane data flow would be split between the UE's two connections. For instance, when the core-network gateway system has data destined to the UE, that data could flow over a split bearer like one of those noted above, with the MN ultimately receiving a portion of the data and transmitting that portion of data over the UE's first air-interface connection to the UE, and with the SN ultimately receiving another portion of the data and transmitting that other portion of data over the UE's second air-interface connection to the UE. Further, if the MN is the controller of the UE's dual-connectivity service, the MN could be responsible for configuring a downlink split ratio such as what percentage of the UE's downlink data flow would be so handled by the MN versus by the SN.

Likewise, the UE's uplink user-plane data flow could also be split between the UE's two connections. For instance, when the UE has data to transmit on the transport network, the UE could transmit a portion of that data over its first air-interface connection to the MN, and that data could flow over an access bearer from the MN to the core-network gateway system for output onto the transport network, and the UE could transmit another portion of the data over its second air-interface connection to the SN, and that data could similarly flow over an access bearer from the SN to the core-network gateway system for output onto the transport network. And similarly here, if the MN is the controller of the UE's dual-connectivity service, the MN could be responsible for configuring an uplink split ratio such as what percentage of the UE's uplink data flow the UE should transmit over its first air-interface connection to the MN versus over its second air-interface connection to the SN.

As to the uplink data split in dual connectivity, one of the UE's connections could also be designated as the UE's "primary uplink path," and the UE's other connection could be designated as the UE's "secondary uplink path." For instance, the UE's air-interface connection with the MN could be designated as the UE's primary uplink path, and the UE's air-interface connection with the SN could be designated as the UE's secondary uplink path. Or the UE's air-interface connection with the SN could be designated as the UE's primary uplink path, and the UE's air-interface connection with the MN could be designated as the UE's secondary uplink path.

In an example implementation, the UE could be configured by default to operate in a single-connection-uplink mode in which the UE would limit its uplink data flow to just its primary uplink path. And upon occurrence of a trigger, such as threshold high uplink data flow from the UE, the UE may then transition from the single-connection-uplink mode to a split-uplink mode in which the UE will split its uplink data flow between its primary and secondary uplink paths.

In this implementation as well, if the MN is the controller of the UE's dual-connectivity, the MN could be responsible for designating which of the UE's connections will be the UE's primary uplink path. Further, as noted above, when the UE will operate in the uplink-split mode, the MN could be responsible for configuring the UE's uplink split ratio.

One technical concern that could arise in such a system is that, when multiple access nodes concurrently serve a UE each over a respective air-interface connection in a respective coverage area, the access nodes may each have a respective level of antenna pattern efficiency that could impact quality of their air-interface communications with the UE.

An access node's antenna pattern efficiency as to the coverage area in which the access node serves the UE could be a physical attribute representing how well the access node's antenna structure focuses energy in a desired area or direction of that coverage area rather than in an undesired area or direction. Without limitation, example antenna-pattern-efficiency metrics could include (i) inverse sector power ratio (SPR), as a ratio of the power of the antenna pattern's main lobe that the antenna structure radiates in the desired area to the power of the antenna pattern's main lobe that the antenna structure radiates outside of that desired area, and (ii) front to back ratio (FBR), as a ratio of the power of the antenna structure's radiation in a main lobe of the antenna pattern to the power of the antenna structure's radiation in a back lobe of the antenna pattern, as well as combinations of these or other metrics.

The antenna pattern efficiency of the antenna structure that an access node uses to provide the coverage area in which the access node serves a UE could impact the quality of air-interface communication between the UE and the access node in that coverage area. For instance, higher antenna pattern efficiency could facilitate improved quality of air-interface communication between the access node and the UE, such as by allowing increased channel receive power, increased SINR, and increased power headroom, any or all of which might correlate with higher peak throughput.

Therefore, the present disclosure provides for taking into account the levels of antenna pattern efficiency corresponding respectively with each of a dual-connected UE's air-interface connections, and using those levels of antenna pattern efficiency as a basis to control the UE's uplink air-interface communication. In one respect, for instance, based on a comparison of the levels of antenna pattern efficiency corresponding with the UE's multiple air-interface connections, the UE's serving MN could configure as the UE's primary uplink path the air-interface connection that has the highest level of antenna pattern efficiency. And in another respect, based on such a comparison, the MN could configure an uplink split ratio for the UE, such as by setting the uplink split ratio to be provide a majority of the UE's uplink data flow on the air-interface connection that has the highest level of antenna pattern efficiency.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
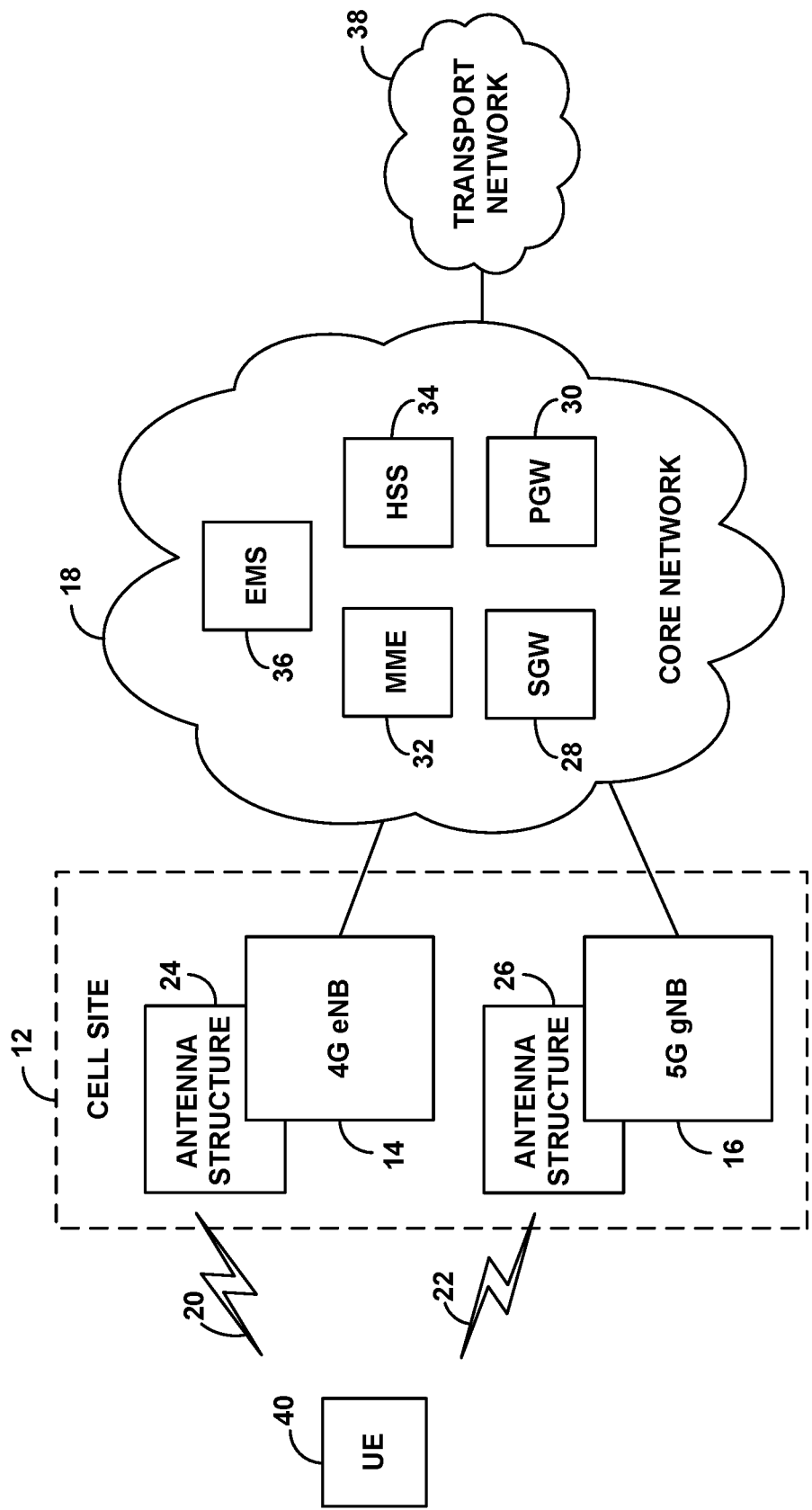
FIG. 1 is a simplified block diagram of an example wireless communication system in which features of the present disclosure can be implemented.

An example implementation will now be described in the context of 4G LTE, 5G NR, and 4G-5G dual connectivity, referred to as EUTRA-NR Dual Connectivity (EN-DC).

With EN-DC, a 4G access node (4G evolved Node-B (eNB)) functions as the MN, and a 5G access node (5G next-generation Node-B (gNB)) functions the SN. Thus, a UE would first establish a standalone-4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations Referring to the drawings, as noted above, FIG. 1 is a simplified block diagram of an example wireless communication system in which various disclosed features could be implemented. In particular, the example system includes a cell site 12 having a 4G eNB 14 and a 5G gNB 16, each being coupled with an example core network 18.

Access nodes 14, 16 could be macro access nodes of the type configured to provide a wide range of coverage or could take other forms, such as small cell access nodes, relays, femtocell access nodes, or the like, possibly configured to provide a smaller range of coverage.

In addition, each access node could be configured to provide coverage and service on one or more carriers, each carrier being in a given frequency band and having a given duplex mode (e.g., FDD or TDD). In the example shown, for instance, the 4G eNB 14 is configured to provide coverage and service on at least one carrier 20, which might be defined in given frequency band. And the 5G gNB 16 is configured to provide coverage and service on at least one carrier 22, which might be in the same or another frequency band.

The air interface on each carrier could be structured as described above by way of example, being divided over time into frames, subframes, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

In an example implementation as shown in FIG. 1, each of the access nodes 14, 16 could include at least one antenna structure, which the access node could use to provide a coverage area on its illustrated carrier. In particular, the 4G eNB 14 is shown including an antenna structure 24 that radiates to provide a coverage area on carrier 20, and the 5G gNB 16 is shown including an antenna structure 26 that radiates to provide a coverage area on carrier 22.

Without limitation, each access node's antenna structure might include an antenna array, having on the order of 2 to 8 antennas or perhaps a massive-MIMO antenna array having many more antennas, perhaps on the order of tens, hundreds, or even thousands of antennas. Alternatively, the access nodes might share use of a common antenna array, perhaps a common massive-MIMO array, with the 4G eNB 14 being configured to use a subset of the antennas and the 5G gNB 16 being configured to use another subset of the antennas. Other arrangements are possible as well.

Each access node's antenna structure could be configured to provide its coverage area with an antenna pattern as noted above, having a main lobe or major lobe and being characterized by an azimuth angle, an elevation angle, a beamwidth, and a radius. As noted above, the beamwidth of the antenna pattern could define an angular width of its main lobe within a horizontal plane, typically measured between half-power (−3 dB) points of the main lobe for instance. Without limitation, the beamwidth of each access node's antenna pattern might be on the order of 65 to 120 degrees. In particular, an access node's antenna structure may be designed or configured to radiate with that width of coverage, which could define a desired width of a representative cell sector.

Figure 2:
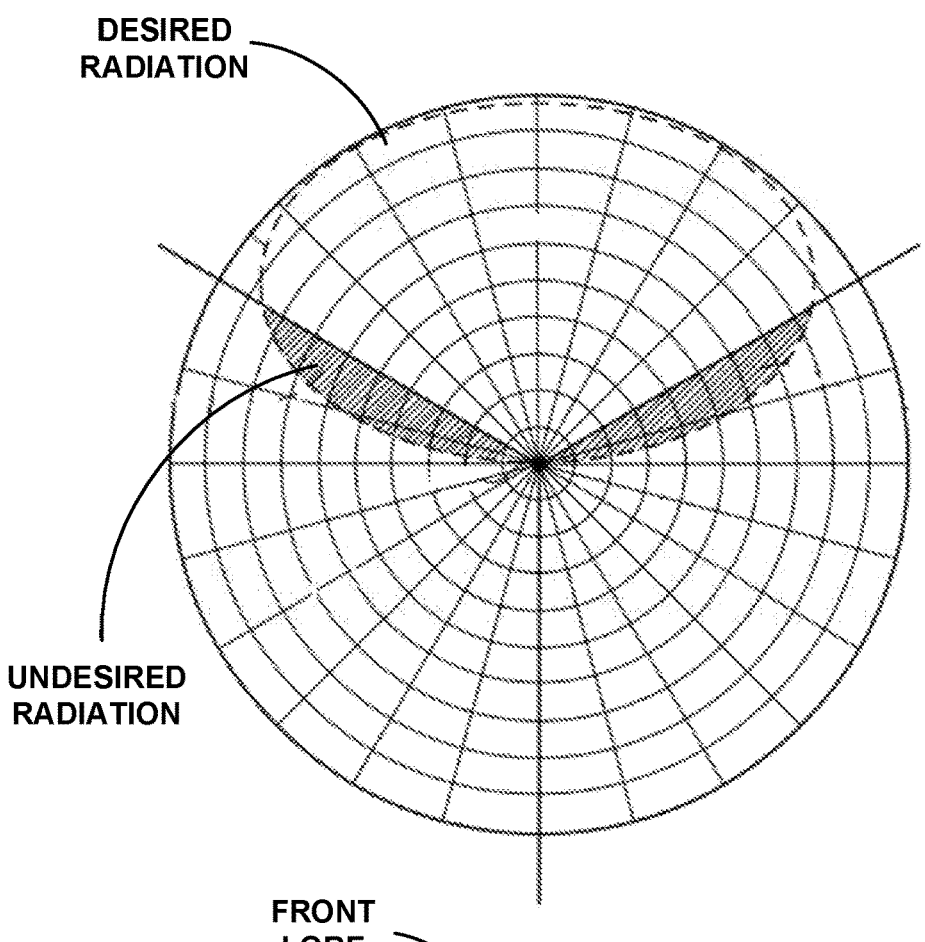
FIG. 2 is a polar plot illustrating an example antenna pattern with example desired and undesired areas of radiation.
Figure 3:
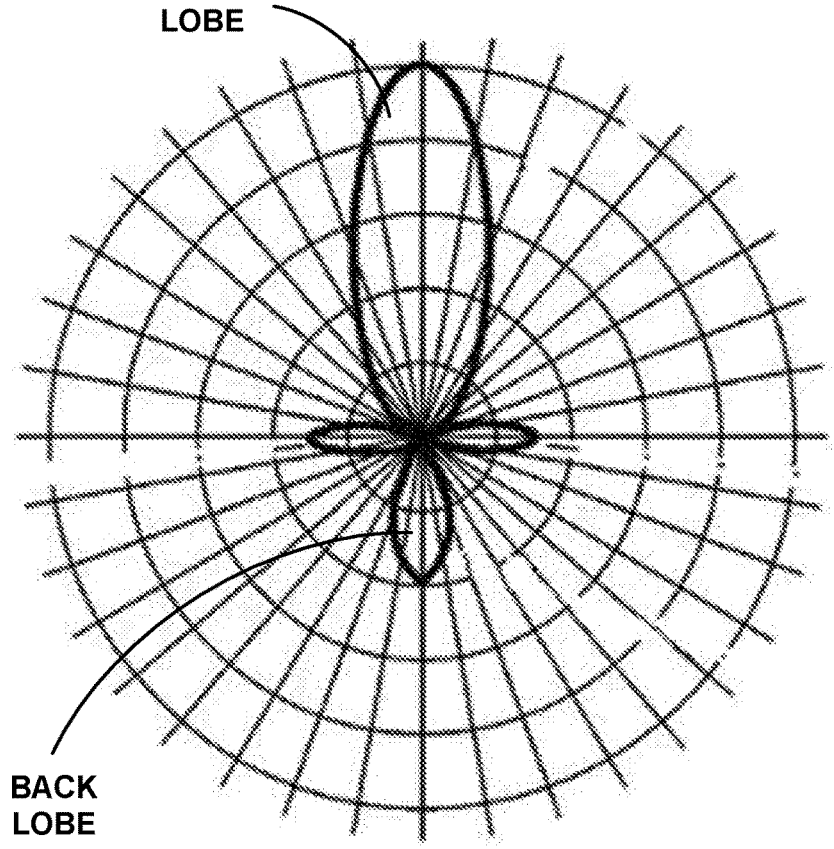
FIG. 3 is a polar plot illustrating an example antenna pattern with example front and back lobes.

Due to imperfections in antenna design and configurations, and given the typical definition of beamwidth as extending to just the half-power points of the main lobe, each access node's antenna pattern may include portions of RF radiation that extend outside of the desired area of coverage. FIGS. 2 and 3 illustrate examples of this, with example antenna patterns depicted on polar plots of power (e.g., decibels) and direction (e.g., degrees) of radiation.

As shown in FIG. 2, portions of the antenna pattern's main lobe may extend beyond the half-power points defining the desired beamwidth, so that the main lobe includes both a desired portion and an undesired portion. And as shown in FIG. 3, the antenna pattern may have one or more minor lobes, including side lobes that radiate sideward and a back lobe that radiates in a direction 180 degrees opposite from the main lobe, so that the main lobe includes an area of desired radiation and the side lobes and back lobe define areas of undesired radiation. Other examples are possible as well.

As noted above, each access node's antenna structure could have a respective level of antenna pattern efficiency representing how well the antenna pattern of the antenna structure focuses energy in the desired coverage area rather than in an undesired area or direction. And as indicated above, example antenna-pattern-efficiency metrics could include inverse SPR and FBR.

In an arrangement where an antenna structure is configured to provide an antenna pattern with a main lobe having a particular beamwidth in a horizontal plane, for instance, antenna pattern efficiency of the antenna structure could be a ratio or percentage of how much energy the antenna pattern lobe radiates within that beamwidth versus how much energy the antenna structure spills over or radiates outside of that beamwidth, perhaps including side portions of the main lobe and one or more side lobes, and perhaps not including a back lobe. The term "sector power ratio" (SPR) is generally used to describe the inverse, i.e., the ratio of the power of the undesired radiation to the power of the desired radiation of the main lobe, typically about 3 to 6%. So antenna pattern efficiency (as opposed to inefficiency) could be characterized as the inverse of the antenna structure's SPR (i.e., inverse SPR), perhaps on the order of about 94 to 97%.

Further, in the typical arrangement where an antenna pattern has a main lobe (or front lobe) that defines the general direction and maximum radiated energy and also has a back lobe that extends in the opposite direction, antenna pattern efficiency of the antenna structure could be a front to back ratio (FBR), i.e., a ratio of the power that the antenna structure radiates in the main lobe to the power that the antenna structure radiates in the back lobe.

The inverse SPR, FBR, and/or of one or more other such metrics representing an access node's antenna pattern efficiency may depend on the carrier frequency on which the access node provides the coverage and may also depend on one or more other factors, such as configuration, age, and environmental conditions for instance. Further, these or other such metrics of an access node's antenna pattern efficiency could be established and recorded as attributes of the access node's coverage area, individually and/or as a weighted combination. For instance, the metrics could be indicated by manufacture specifications and/or could be could be determined or updated from time to time based on measurements of desired and undesired radiation from the antenna structure. And the metrics could be recorded at the access node and/or in a central data repository or other node, possibly in correlation with an identifier of the coverage area.

In an example implementation, the core network 18 could be a packet-switched network, such as an Evolved Packet Core (EPC) network or Next Generation Core (NGC) network, supporting Internet Protocol (IP) communication and virtual packet tunnel interfaces between network nodes. In an example EPC arrangement as shown, for instance, the core network 18 includes a serving gateway (SGW) 28, a packet data network gateway (PGW) 30, a mobility management entity (MME) 32, a home subscriber server (HSS) 34, and an element management system (EMS) 36, though other arrangements are possible as well.

With this arrangement, each access node could communicate with the SGW 28, the SGW 28 could communicate with the PGW 30, and the PGW 30 could provide connectivity with a transport network 38, such as the Internet. Further, each access node could communicate with the MME 32, and the MME 32 could communicate with the SGW 28, so that the MME 32 could coordinate setup of bearers for UEs to engage in packet-data communication. Alternatively, just one of the access nodes, such as the 4G eNB 14, may so communicate with the MME 32.

Still further, the HSS 34 could include or otherwise have access to UE profile records, which could specify service-subscription plans, UE configurations, and/or other such UE capability information. And the EMS 36 could operate as the central repository noted above, storing various operational data and controlling and managing operation of various network elements.

FIG. 1 also depicts an example UE 40 that may be within coverage of cell site 12 and may be served by the access nodes 14, 16. This UE could take any of the forms noted above, among other possibilities and may have a 4G LTE radio and associated RF circuitry and logic to support 4G LTE service, a 5G NR radio and associated RF circuitry and logic to support 5G NR service, and may further be configured to support EN-DC service.

In line with the discussion above, we can assume for present purposes that UE 60 is currently served with EN-DC by the 4G eNB 14 and the 5G gNB 16, with a 4G connection on the carrier 20 on which the 4G eNB 14 provides coverage and service, and a 5G connection one or the carrier 22 on which the 5G gNB 14 provides coverage and service. For instance, the UE might have established a 4G connection with the 4G eNB 14 on carrier 20, and the 4G eNB 14, operating as MN, might then have determined from profile data that the UE supports EN-DC service and might therefore have coordinated setup of EN-DC service for the UE, including setup of a 5G connection with the 5G gNB 16 on carrier 22, and setup of a split bearer.

With EN-DC service configured for the UE, the 4G eNB 14 and 5G gNB 16 could then concurrently serve the UE, each over its respective connection with the UE and each in the manner discussed above.

For instance, when the PGW 30 receives user-plane data from the transport network 38 for transmission to the UE, that data may flow over a split access bearer, and the 4G eNB 14 may transmit a portion of the data over the UE's 4G connection to the UE, while the 5G gNB 16 may transmit another portion of the data over the UE's 5G connection to the UE. And when the UE has user-plane data to transmit on the transport network 38, the UE may transmit a portion of the data over its 4G connection to the 4G eNB 14, which may forward the data over an access bearer for transmission directly or indirectly through the core network 18 to the transport network 38, and the UE may transmit another portion of the data over its 5G connection to the 5G gNB 16, which may likewise forward the data over an access bearer for transmission directly or indirectly through the core network 18 to the transport network 38.

In line with the discussion above, in this EN-DC arrangement, the 4G eNB 14, as MN, could be responsible for controlling the extent to which the UE provides uplink transmission on the UE's 4G connection versus on the UE's 5G connection. To exert this control, the 4G eNB 14 could engage in RRC signaling or the like with the UE, directing the UE how the UE should distribute the UE's uplink communication, and the UE could respond to such directives from the 4G eNB 14 by handling the UE's uplink communications accordingly.

For example, the 4G eNB 14 may select either of the UE's 4G and 5G connections to be the UE's primary uplink path that the UE would use exclusively for the UE's uplink communication until the rate of the UE's uplink data flow exceeds a threshold level. The 4G eNB 14 may therefore transmit to the UE an RRC message that specifies the selected connection as the UE's primary uplink path. And in response, the UE may thus restrict its uplink communications to that connection unless and until the UE transitions to the split-uplink mode. Thus, when the UE has uplink data to transmit, the UE may transmit the data on just the selected, designated connection, to the access node serving that connection.

Further, the 4G eNB 14 may set an uplink data-rate threshold or other trigger for transitioning the UE to the split-uplink mode. And the 4G eNB 14 might inform the UE of that trigger to enable the UE to do the transitioning itself when the trigger occurs, or the 4G eNB 14 might monitor for occurrence of the trigger and, when the trigger occurs, then direct the UE to transition the split-uplink mode.

Still further, when the UE is or will operate in the split-uplink mode, the 4G eNB 14 may decide what the UE's uplink split ratio should be, such as what percentage of the UE's uplink user-plane data flow the UE should transmit over its 4G connection to the 4G eNB 14 versus what percentage of the UE's uplink user-plane data flow the UE should transmit over its 5G connection to the 5G gNB 16. The 4G eNB 14 may therefore transmit to the UE an RRC message that specifies the uplink split ratio. And in response, the UE may split its uplink data communications accordingly, transmitting the designated portion of its data on its 4G connection to the 4G eNB and transmitting the other designated portion of its data on its 5G connection to the 5G gNB.

In line with the discussion above, the 4G eNB 14 could control various such aspects of the UE's uplink communication based on a comparison of the levels of antenna pattern efficiency associated respectively with each of the UE's connections. For instance, based on such a comparison, the 4G eNB 14 could select as the UE's primary uplink path the UE's connection having the higher associated antenna pattern efficiency. And/or based on such a comparison, the 4G eNB 14 could set an uplink split ratio for application by the UE. (At an extreme, an uplink split ratio of 100% on one connection and 0% on the other connection could likewise amount to setting as the UE's primary uplink path the connection to which the UE will exclusively limit its uplink user-plane communication.)

The level of antenna pattern efficiency associated respectively with each of the UE's connections could be a level of antenna pattern efficiency most recently established for the antenna structure that provides the coverage area in which that the air-interface connection is defined. As discussed above, that level of antenna pattern efficiency could be represented by various metrics, such as inverse SPR, FBR, or perhaps a weighted combination of these and/or other metrics.

And the 4G eNB 14 could learn the level of antenna pattern efficiency associated respectively with each of the UE's air-interface connections in various ways. As to the UE's connection with the 4G eNB 14, for instance, the 4G eNB 14 could determine the associated level of antenna pattern efficiency by referring to access node profile data stored at the access node and/or by querying the EMS 36. And as to the UE's connection with the 5G gNB 16, the 4G eNB 14 could determine the associated level of antenna pattern efficiency by querying the 5G gNB 16 and/or the EMS 36.

The 4G eNB 14 could then use a comparison of these measures as a basis to control the UE's uplink communication as noted above.

For example, the 4G eNB 14 could determine that a given one of the UE's connections has a higher level of antenna pattern efficiency (e.g., higher inverse SPR, lower SPR, and/or higher FBR) than the UE's other connection, and, based at least on this determination, the 4G eNB 14 could select the given connection to be the UE's primary uplink path and could configure the UE accordingly.

As another example, the 4G eNB 14 could control whether the UE operates in single-connection-uplink mode or rather in split-uplink mode, based on whether the levels of antenna pattern efficiency of the UE's connections are threshold different from each other. For instance, if the 4G eNB 14 determines that a difference between the levels of antenna pattern efficiency of the UE's connections is at least as low as a threshold level, then, based at least on that determination, the 4G eNB 14 could direct the UE to operate in the split-uplink mode rather than in the single-connection-uplink mode. Whereas, if the 4G eNB 14 determines that the difference between the levels of antenna pattern efficiency of the UE's connections is greater than that or another higher threshold level, then, based at least on that determination, the 4G eNB 14 could direct the UE to operate in the single-connection-uplink mode rather than in the split-uplink mode.

And as yet another example, when the UE is or will operate in the split-uplink mode, the 4G eNB 14 could establish and configure the UE to apply an uplink split ratio based on a comparison of the levels of antenna pattern efficiency of the UE's connections. As noted above, for instance, the 4G eNB 14 could set the uplink split ratio to provide a majority of the UE's uplink data flow on the air-interface connection that has the higher level of antenna pattern efficiency. For instance, if the 4G eNB 14 determines that the level of antenna pattern efficiency of the UE's 4G connection is 94% and the level of antenna pattern efficiency of the UE's 5G connection is 97%, then the 4G eNB 14 may configure the UE's uplink split ratio to provide a majority of the UE's uplink data flow on the UE's 5G connection and the remainder on the UE's 4G connection.

Figure 4:
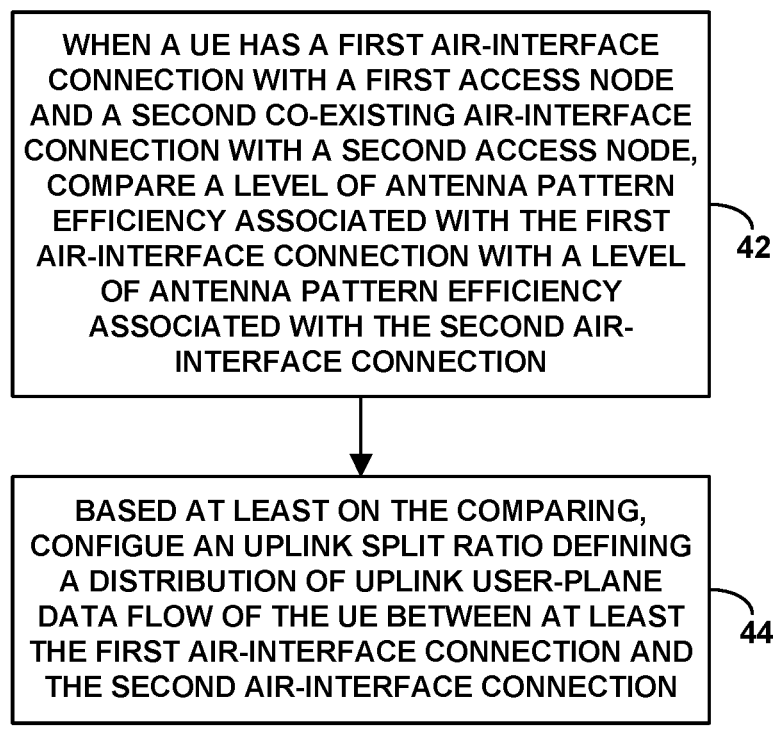
FIG. 4 is a flow chart depicting an example method in accordance with the disclosure.

Variations from these examples, including consideration of additional factors as well, and controlling other aspects of the dual-connected UE's uplink communication, could be possible too. FIG. 4 is next a flow chart depicting an example method that could be carried out in accordance with the present disclosure to control uplink communication from UE that has at least two co-existing air-interface connections including a first air-interface connection with a first access node and a second air-interface connection with a second access node. As shown in FIG. 2, at block 42, the example method includes comparing a level of antenna pattern efficiency associated with the first air-interface connection with a level of antenna pattern efficiency associated with the second air-interface connection. And at block 44, the example method includes, based at least on the comparing, configuring an uplink split ratio defining a distribution of uplink user-plane data flow of the UE between at least the first air-interface connection and the second air-interface connection.

In line with the discussion above, this method could be carried out by a given one of the first and second access nodes. And in that case, configuring the uplink split ratio could involve transmitting from the given access node to the UE a directive (e.g., an RRC connection-reconfiguration message) that causes the UE to implement the uplink split ratio.

Further, as discussed above, the first access node could have a first antenna structure that radiates to define a first antenna pattern defining a first coverage area in which the first air-interface connection is established, in which case the level of antenna pattern efficiency associated with the first air-interface connection could comprise a level of antenna pattern efficiency of the first antenna structure. And likewise, the second access node could have a second antenna structure that radiates to define a second antenna pattern defining a second coverage area in which the second air-interface connection is established, in which case the level of antenna pattern efficiency associated with the second air-interface connection could comprise a level of antenna pattern efficiency of the second antenna structure.

In addition, as discussed above, the level of antenna pattern efficiency of the first antenna structure could be based on an SPR of the first antenna pattern (e.g., an inverse SPR), and wherein the level of antenna pattern efficiency of the second antenna structure could be based on an SPR of the second antenna pattern. And/or the level of antenna pattern efficiency of the first antenna structure could be based on an FBR of the first antenna pattern, and the level of antenna pattern efficiency of the second antenna structure could be based on an FBR of the second antenna pattern.

As further discussed above, the UE could have a single-connection-uplink mode of operation in which the uplink split ratio is 100% of the uplink user-plane data flow on just one of the first and second air-interface connections and 0% of the uplink user-plane data flow on the other of the first and second air-interface connections.

And in that case, the act of configuring the uplink split ratio based at least on the comparing could involve (i) based on the comparing, selecting a given one of the first and second air-interface connections to be the one air-interface connection on which the UE will provide 100% of the uplink user-plane data flow in the single-connection-uplink mode and (ii) configuring the UE in accordance with the selecting. Here, for instance, the selecting of the given air-interface connection based on the comparing could involve selecting the given air-interface connection based on a determination that antenna pattern efficiency associated with the given air-interface connection is higher than the antenna pattern efficiency associated with the other of the first and second air-interface connections.

Further, the UE could also have an uplink-split mode of operation in which the uplink data split is greater than 0% respectively on each of the air-interface connections, i.e., where the UE transmits some of its uplink data flow on one of the air-interface connections and other of its uplink data flow on the other of the air-interface connections. And in that case, the act of configuring the uplink split ratio based on the comparing could involve (i) based on the comparing, selecting between the UE operating in the single-connection-uplink mode and the UE operating in the split-uplink mode and (ii) configuring the UE in accordance with the selecting.

Still further, the act of configuring the uplink split ratio based at least on the comparing could involve (i) based on the comparing, selecting a given one of the first and second air-interface connections to carry a majority of the uplink user-plane data flow of the UE and (ii) configuring the UE in accordance with the selecting. Here, for instance, the UE could be configured to transmit greater than 50% of its uplink user-plane data flow on the selected air-interface connection and less than 50% of its uplink user-plane data flow on the other of the first and second air-interface connections. And the selecting of the given air-interface connection based on the comparing could involve selecting the given air-interface connection based on a determination that the antenna pattern efficiency associated with the given air-interface connection is higher than the antenna pattern efficiency associated with the other of the first and second air-interface connections.

Figure 5:
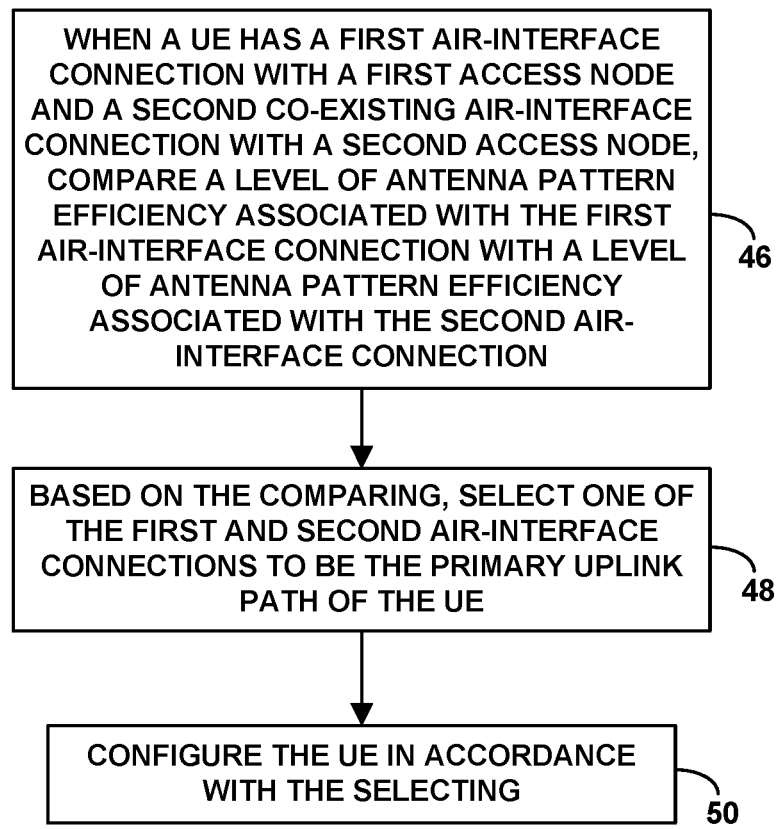
FIG. 5 is another flow chart depicting an example method in accordance with the disclosure.

FIG. 5 is next another flow chart of an example method that could be carried out in accordance with the present disclosure to control uplink communication from a UE that has at least two co-existing air-interface connections including a first air-interface connection with a first access node and a second air-interface connection with a second access node. This method could be operable in a scenario where one of the first and second air-interface connections would define a primary uplink path of the UE to which the UE would restrict its uplink user-plane data transmission unless and until a trigger condition causes the UE to split its uplink user-plane data transmission between the first and second air-interface connections.

As shown in FIG. 3, at block 46, the example method includes comparing a level of antenna pattern efficiency associated with the first air-interface connection with a level of antenna pattern efficiency associated with the second air-interface connection. Further, at block 48, the example method includes selecting, based at least on the comparing, one of the first and second air-interface connections to be the primary uplink path of the UE. And at block 50, the example method includes configuring the UE in accordance with the selecting.

Various features described above can be implemented in this context as well, and vice versa.

For instance, the act of selecting, based at least on the comparing, one of the first and second air-interface connections to be the primary uplink path of the UE could involve (i) determining, based on the comparing, that the level of antenna pattern efficiency associated with the first air-interface connection is greater than the level of antenna pattern efficiency associated with the second air-interface connection and (ii) based at least on the determining, selecting the first air-interface connection to be the primary uplink path of the UE.

Figure 6:
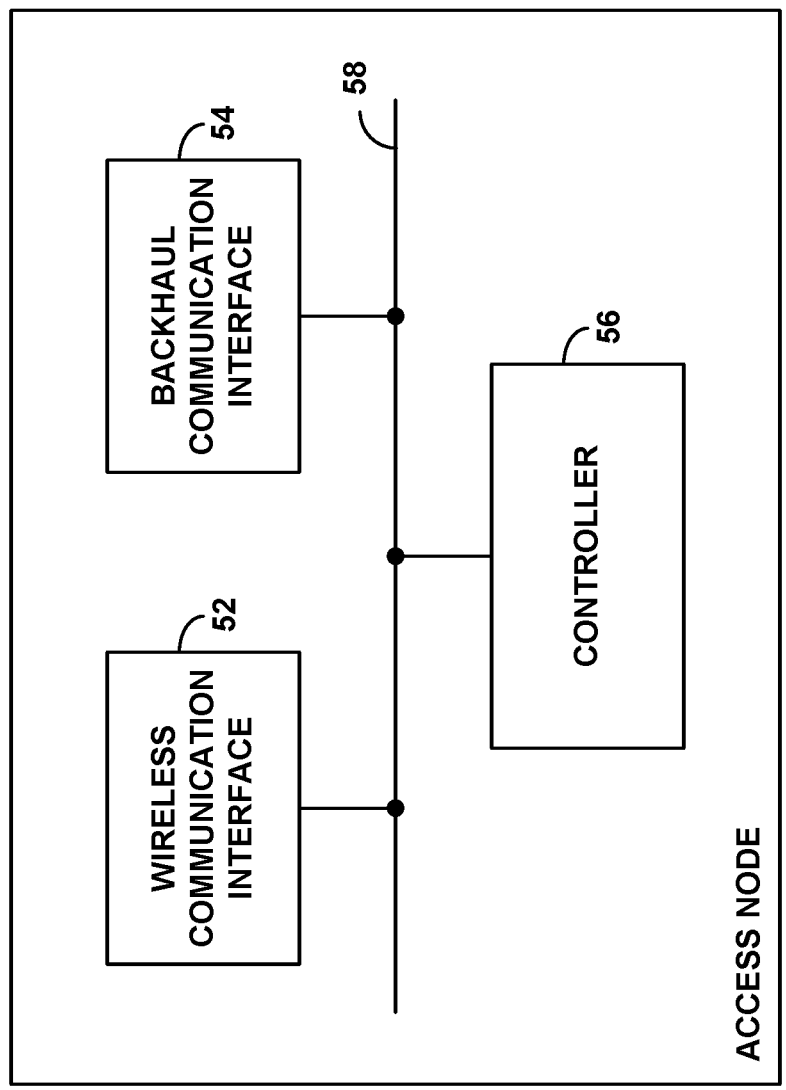
FIG. 6 is a simplified block diagram of an example access node operable in accordance with the disclosure.

Finally, FIG. 6 is a simplified block diagram of an example first access node that could implement various features described herein, to control uplink communication from a UE that has at least two co-existing air-interface connections including a first air-interface connection with the first access node and a second air-interface connection with a second access node. For instance, the first access node could be an MN serving the UE while the UE has dual-connectivity, such as a 4G eNB that serves the UE as part of EN-DC.

As shown in FIG. 6, the example first access node includes a wireless communication interface 52, a backhaul communication interface 54, and a controller 56, all of which could be integrated together and/or communicatively linked together by a system bus, network, or other connection mechanism 58.

In an example implementation, the wireless communication interface 52 could comprise an antenna structure, which could be tower mounted or could take other forms, and associated components such as a power amplifier and a wireless transceiver, so as to facilitate providing coverage on one or more carriers and serving the UE over the first air-interface connection. And the backhaul communication interface 54 could comprise network communication interface such as an Ethernet interface, through which the first access node engages in backhaul communication.

Further, the controller 56 could comprise one or more processing units (e.g., one or more general purpose processors and/or specialized processors) programmed to cause the first access node to carry out various operations such as those discussed above. For instance, the controller 56 could comprise one or more non-transitory data storage units (e.g., one or more magnetic, optical, or flash storage components) which could store program instructions executable by the one or more processing units to cause the first access node to carry out such operations.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling uplink communication from a user equipment device (UE) that has at least two co-existing air-interface connections including a first air-interface connection with a first access node and a second air-interface connection with a second access node, the method comprising:
    comparing a level of antenna pattern efficiency associated with the first air-interface connection with a level of antenna pattern efficiency associated with the second air-interface connection; and
    based at least on the comparing, configuring an uplink split ratio defining a distribution of uplink user-plane data flow of the UE between at least the first air-interface connection and the second air-interface connection,
    wherein the first access node has a first antenna structure that radiates to define a first antenna pattern defining a first coverage area in which the first air-interface connection is established, and wherein the level of antenna pattern efficiency associated with the first air-interface connection comprises a level of antenna pattern efficiency of the first antenna structure based on at least one factor selected from the group consisting of (i) a sector power ratio of the first antenna pattern and (ii) a front to back ratio of the first antenna pattern, and
    wherein the second access node has a second antenna structure that radiates to define a second antenna pattern defining a second coverage area in which the second air-interface connection is established, and wherein the level of antenna pattern efficiency associated with the second air-interface connection comprises a level of antenna pattern efficiency of the second antenna structure based on at least one factor selected from the group consisting of (i) a sector power ratio of the second antenna pattern and (ii) a front to back ratio of the second antenna pattern.

2. The method of claim 1, wherein the method is carried out by a given one of the first and second access nodes, and wherein configuring the uplink split ratio comprises transmitting from the given access node to the UE a directive that causes the UE to implement the uplink split ratio.

3. The method of claim 1, wherein the UE has a single-connection-uplink mode of operation in which the uplink split ratio is 100% of the uplink user-plane data flow on just one of the first and second air-interface connections and 0% of the uplink user-plane data flow on the other of the first and second air-interface connections, and
    wherein configuring the uplink split ratio based at least on the comparing comprises (i) based on the comparing, selecting a given one of the first and second air-interface connections to be the one air-interface connection on which the UE will provide 100% of the uplink user-plane data flow in the single-connection-uplink mode of operation and (ii) configuring the UE in accordance with the selecting.

4. The method of claim 3, wherein selecting the given air-interface connection based on the comparing comprises selecting the given air-interface connection based on a determination that the antenna pattern efficiency associated with the given air-interface connection is higher than the antenna pattern efficiency associated with the other of the first and second air-interface connections.

5. The method of claim 1, wherein the UE has a single-connection-uplink mode of operation in which the uplink data split is 100% on one air-interface connection and 0% on the other air-interface connection, and the UE has an uplink-split mode of operation in which the uplink data split is greater than 0% respectively on each of the air-interface connections, and
    wherein configuring the uplink split ratio based on the comparing comprises (i) based on the comparing, selecting between the UE operating in the single-connection-uplink mode and the UE operating in the split-uplink mode and (ii) configuring the UE in accordance with the selecting.

6. The method of claim 1, wherein configuring the uplink split ratio based at least on the comparing comprises (i) based on the comparing, selecting a given one of the first and second air-interface connections to carry a majority of the uplink user-plane data flow of the UE and (ii) configuring the UE in accordance with the selecting.

7. The method of claim 6, wherein selecting the given air-interface connection based on the comparing comprises selecting the given air-interface connection based on a determination that the antenna pattern efficiency associated with the given air-interface connection is higher than the antenna pattern efficiency associated with the other of the first and second air-interface connections.

8. A first access node operable to control uplink communication from a user equipment device (UE) that has at least two co-existing air-interface connections including a first air-interface connection with the first access node and a second air-interface connection with a second access node, the first access node comprising:
　a wireless communication interface including an antenna structure through which to serve the UE over the first air-interface connection;
　a backhaul communication interface through which the engage in backhaul communication; and
　a controller, wherein the controller causes the first access node to carry out operations including:
　　comparing a level of antenna pattern efficiency associated with the first air-interface connection with a level of antenna pattern efficiency associated with the second air-interface connection, and
　　based at least on the comparing, configuring an uplink split ratio defining a distribution of uplink user-plane data flow of the UE between at least the first air-interface connection and the second air-interface connection,
　wherein the first access node has a first antenna structure that radiates to define a first antenna pattern defining a first coverage area in which the first air-interface connection is established, and wherein the level of antenna pattern efficiency associated with the first air-interface connection comprises a level of antenna pattern efficiency of the first antenna structure based on at least one factor selected from the group consisting of (i) a sector power ratio of the first antenna pattern and (ii) a front to back ratio of the first antenna pattern, and
　wherein the second access node has a second antenna structure that radiates to define a second antenna pattern defining a second coverage area in which the second air-interface connection is established, and wherein the level of antenna pattern efficiency associated with the second air-interface connection comprises a level of antenna pattern efficiency of the second antenna structure based on at least one factor selected from the group consisting of (i) a sector power ratio of the second antenna pattern and (ii) a front to back ratio of the second antenna pattern.

9. The first access node of claim 8, wherein the controller comprises a processing unit, non-transitory data storage, and program instructions stored in the non-transitory data storage and executable by the processing unit to carry out the operations.

10. The first access node of claim 8, wherein the UE has a single-connection-uplink mode in which the uplink split ratio is 100% of the uplink user-plane data flow on just one of the first and second air-interface connections and 0% of the uplink user-plane data flow on the other of the first and second air-interface connections, and
　wherein configuring the uplink split ratio based at least on the comparing comprises (i) based on the comparing, determining that the antenna pattern efficiency associated with the first air-interface connection is higher than the antenna pattern efficiency associated with the second air-interface connection, (ii) based at least on the determining, selecting a given one of the first and second air-interface connections to be the one air-interface connection on which the UE will provide 100% of the uplink user-plane data flow in the single-connection-uplink mode and (iii) configuring the UE in accordance with the selecting.

11. The first access node of claim 8, wherein configuring the uplink split ratio based at least on the comparing comprises (i) based on the comparing, determining that the antenna pattern efficiency associated with the first air-interface connection is higher than the antenna pattern efficiency associated with the second air-interface connection, (ii) based at least on the determining, selecting the first air-interface connection to carry a majority of the uplink user-plane data flow of the UE and (iii) configuring the UE in accordance with the selecting.

12. A method for controlling uplink communication from a user equipment device (UE) that has at least two co-existing air-interface connections including a first air-interface connection with a first access node and a second air-interface connection with a second access node, the method comprising:
　comparing a level of antenna pattern efficiency associated with the first air-interface connection with a level of antenna pattern efficiency associated with the second air-interface connection; and
　based at least on the comparing, configuring an uplink split ratio defining a distribution of uplink user-plane data flow of the UE between at least the first air-interface connection and the second air-interface connection,
　wherein configuring the uplink split ratio based at least on the comparing comprises (i) based on the comparing, selecting a given one of the first and second air-interface connections to carry a majority of the uplink user-plane data flow of the UE and (ii) configuring the UE in accordance with the selecting, and
　wherein selecting the given air-interface connection based on the comparing comprises selecting the given air-interface connection based on a determination that the antenna pattern efficiency associated with the given air-interface connection is higher than the antenna pattern efficiency associated with the other of the first and second air-interface connections.

13. The method of claim 12, wherein the method is carried out by a given one of the first and second access nodes, and wherein configuring the uplink split ratio comprises transmitting from the given access node to the UE a directive that causes the UE to implement the uplink split ratio.

14. The method of claim 12, wherein the UE has a single-connection-uplink mode of operation in which the uplink split ratio is 100% of the uplink user-plane data flow on just one of the first and second air-interface connections and 0% of the uplink user-plane data flow on the other of the first and second air-interface connections, and
　wherein configuring the uplink split ratio based at least on the comparing comprises (i) based on the comparing, selecting a given one of the first and second air-interface connections to be the one air-interface connection on which the UE will provide 100% of the uplink user-plane data flow in the single-connection-uplink mode of operation and (ii) configuring the UE in accordance with the selecting.

15. The method of claim 14, wherein selecting the given air-interface connection based on the comparing comprises selecting the given air-interface connection based on a determination that the antenna pattern efficiency associated with the given air-interface connection is higher than the antenna pattern efficiency associated with the other of the first and second air-interface connections.

16. The method of claim 12, wherein the UE has a single-connection-uplink mode of operation in which the uplink data split is 100% on one air-interface connection and 0% on the other air-interface connection, and the UE has an uplink-split mode of operation in which the uplink data split is greater than 0% respectively on each of the air-interface connections, and wherein configuring the uplink split ratio based on the comparing comprises (i) based on the comparing, selecting between the UE operating in the single-connection-uplink mode and the UE operating in the split-uplink mode and (ii) configuring the UE in accordance with the selecting.

17. The method of claim 12, wherein the first access node has a first antenna structure that radiates to define a first antenna pattern defining a first coverage area in which the first air-interface connection is established, and wherein the level of antenna pattern efficiency associated with the first air-interface connection is based on a sector power ratio of the first antenna pattern, and wherein the second access node has a second antenna structure that radiates to define a second antenna pattern defining a second coverage area in which the second air-interface connection is established, and wherein the level of antenna pattern efficiency associated with the second air-interface connection is based on a sector power ratio of the second antenna pattern.

18. The method of claim 12, wherein the first access node has a first antenna structure that radiates to define a first antenna pattern defining a first coverage area in which the first air-interface connection is established, and wherein the level of antenna pattern efficiency associated with the first air-interface connection is based on a front to back ratio of the first antenna pattern, and wherein the second access node has a second antenna structure that radiates to define a second antenna pattern defining a second coverage area in which the second air-interface connection is established, and wherein the level of antenna pattern efficiency associated with the second air-interface connection is based on a front to back ratio of the second antenna pattern.

* * * * *